US011811496B2

(12) United States Patent
Gao et al.

(10) Patent No.: US 11,811,496 B2
(45) Date of Patent: Nov. 7, 2023

(54) PHASE DELTA BASED MOTION DETECTION

(71) Applicant: QUALCOMM Incorporated, San Diego, CA (US)

(72) Inventors: Yuan Gao, San Diego, CA (US); Mihir Vijay Laghate, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 17/483,566

(22) Filed: Sep. 23, 2021

(65) Prior Publication Data

US 2023/0086737 A1 Mar. 23, 2023

(51) Int. Cl.
 *H04B 7/26* (2006.01)
(52) U.S. Cl.
 CPC ...................... *H04B 7/26* (2013.01)
(58) Field of Classification Search
 CPC ...................................................... H04B 7/26
 See application file for complete search history.

(56) References Cited

U.S. PATENT DOCUMENTS

| 5,173,710 A * | 12/1992 | Kelley ............... G01S 5/009 342/442 |
| 2010/0298001 A1 * | 11/2010 | Dimou ............... G01S 11/08 455/441 |
| 2016/0286425 A1 * | 9/2016 | Gormley ............ H04W 52/00 |
| 2019/0379434 A1 * | 12/2019 | Lindskog ............ G01P 13/04 |

\* cited by examiner

*Primary Examiner* — Hsinchun Liao
(74) *Attorney, Agent, or Firm* — Procopio, Cory, Hargreaves & Savitch LLP

(57) ABSTRACT

A UE may receive at least two baseband signals at two or more antenna or beam ports of the UE over a measurement period, and determine an amount of motion of the UE based on the received at least two baseband signals. In one aspect, the amount of motion of the UE may be determined based on a variation of at least one phase delta of the at least one channel. In another aspect, the amount of motion of the UE may be determined based on a correlation between the at least two baseband signals.

17 Claims, 12 Drawing Sheets

PHASE DELTA BASED MOTION DETECTION

TECHNICAL FIELD

The present disclosure relates generally to communication systems, and more particularly, to a method of wireless communication including a phase delta based motion detection.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE), and the UE may receive at least two baseband signals at two or more antenna or beam ports of the UE over a measurement period, and determine an amount of motion of the UE based on the received at least two baseband signals.

In one aspect, the amount of motion of the UE may be determined based on at least one phase delta of the at least one channel. The UE may identify a plurality of phase deltas of at least two baseband signals over a measurement period, the plurality of phase deltas including a baseband phase delta and an analog radio frequency (RF) phase-locked loop (PLL) (RF PLL) phase delta. The UE may calculate and unwrap at least one phase delta of at least one channel based on the identified plurality of phase deltas, and detect an amount of motion of the UE based on a variation of the at least one phase delta of at least one channel. That is, the UE may determine that the variance is greater than a threshold variance value and that the variance is less than or equal to the threshold variance value.

In another aspect, the amount of motion of the UE may be determined based on a correlation between the at least two baseband signals. The UE may identify at least two baseband signals and an analog RF PLL phase delta over a measurement period, and calculate a correlation between the at least two baseband signals based on the identified at least two baseband signals and the analog RF PLL phase delta. the UE may detect an amount of motion of the UE based on the calculated correlation. That is, the UE may determine that the UE is in motion based on the correlation being less than a threshold correlation value, and that the UE is stationary based on the correlation being greater than or equal to the threshold correlation value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
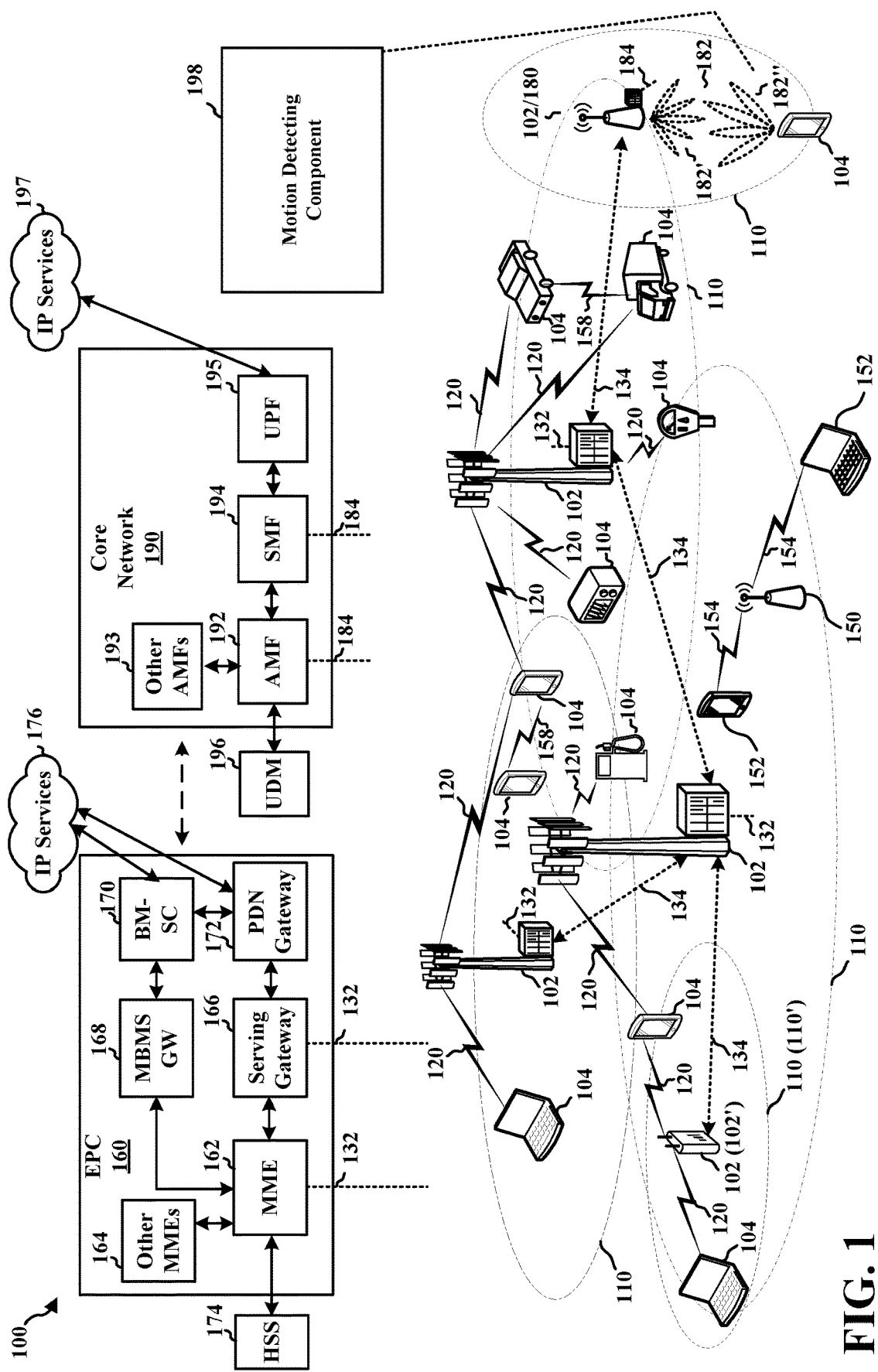
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR2-2, FR4, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a motion detection component 198 configured to identify a plurality of phase deltas of at least two baseband signals over a measurement period, calculate at least one phase delta of at least one channel based on the identified plurality of phase deltas, and detect an amount of motion of the UE based on the calculated at least one phase delta of the at least one channel. The motion detection component 198 may be also configured to identify at least two baseband signals and an analog RF PLL phase delta over a measurement period, calculate a correlation between the at least two baseband signals based on the identified at least two baseband signals and the analog RF PLL phase delta, and detect an amount of motion of the UE based on the calculated correlation. Although the following description may be focused on 5G NR, the concepts described herein may be applicable to other similar areas, such as LTE, LTE-A, CDMA, GSM, and other wireless technologies.

Figure 2:
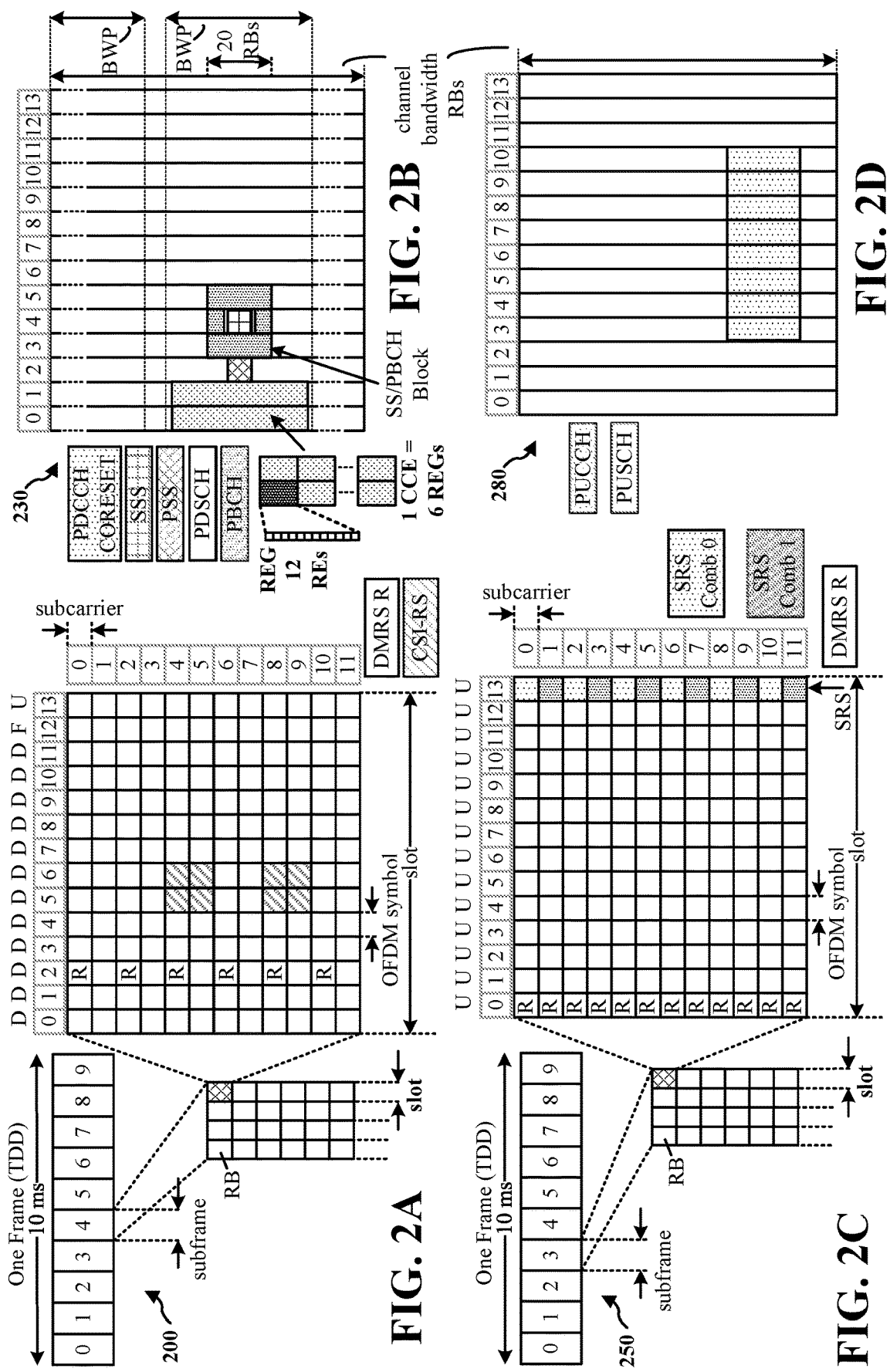
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame.

The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
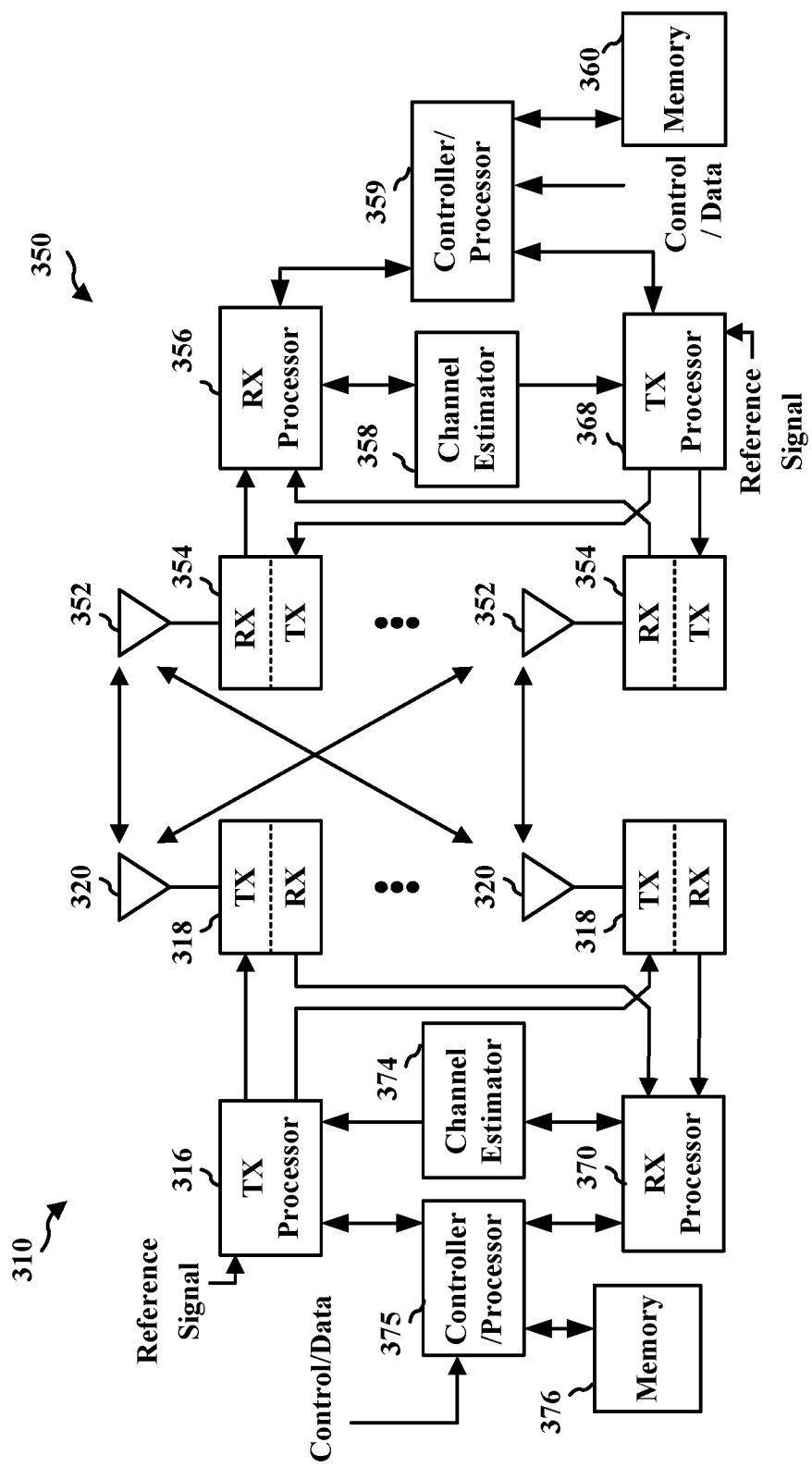
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

In some aspects, a UE operating in the millimeter wave (mmW) spectrum may perform an analog beamforming with a number of analog beams. To perform the analog beamforming, the UE may periodically measure a plurality of beams to determine the best serving beam in a mobility environment. That is, in the mobility environment that the UE is in motion, the UE may periodically measure the plurality of beams to determine the best serving beam. To perform the measurement activities, the UE may wake up, which may consume power in the radio frequency (RF) module and/or modem. That is, the UE may be configured to wake up to measure the plurality of beams for the analog beamforming, and waking up the UE may consume the power of the UE in the RF module and/or the modem.

To save power without scarifying noticeable performance loss, an adaptive measurement period is preferred. That is, the UE may reduce the power consumption from waking up without reduced performance by configuring the adaptive measurement period. The adaptive measurement period may refer to a beam measurement configuration including a less frequent measurement configuration in a low mobility environment and a high frequent measurement configuration in a high mobility environment. That is, the UE with the adaptive measurement period may be configured to measure the plurality of beams at a lower measurement frequency, e.g., a longer measuring period, based on the UE having a low mobility, and measure the plurality of beams at a higher measurement frequency, e.g., a shorter measuring period, based on the UE having a high mobility. Accordingly, the UE may detect whether the UE has a high mobility, e.g., the UE is in motion, or the UE has a low mobility, e.g., a stationary UE.

In some aspects, the UE may perform motion detection to provide information for tuning the UE measurement frequency in terms of optimizing UE battery consumption. That is, to support the adaptive measurement period, the UE may perform motion detection to provide or generate the information on the UE's mobility, and the UE may adjust the period or the frequency of the beam measurement to reduce the power consumption.

The UE may adopt a motion detection method that may be sensitive to UE motion with a low latency. In some aspects, the UE may receive two baseband signals at two or more antenna/beam ports, and the UE may detect the motion of the UE based on the two baseband signals received at the two or more antenna/beam ports. In one aspect, the UE may include a phase delta based motion detection. Here, the phase delta may refer to a phase difference between the two mmW signals received at the two or more antenna/beam ports. The phase delta may be sensitive to motion, and the phase delta may be used to detect motion with low latency.

Figure 4:
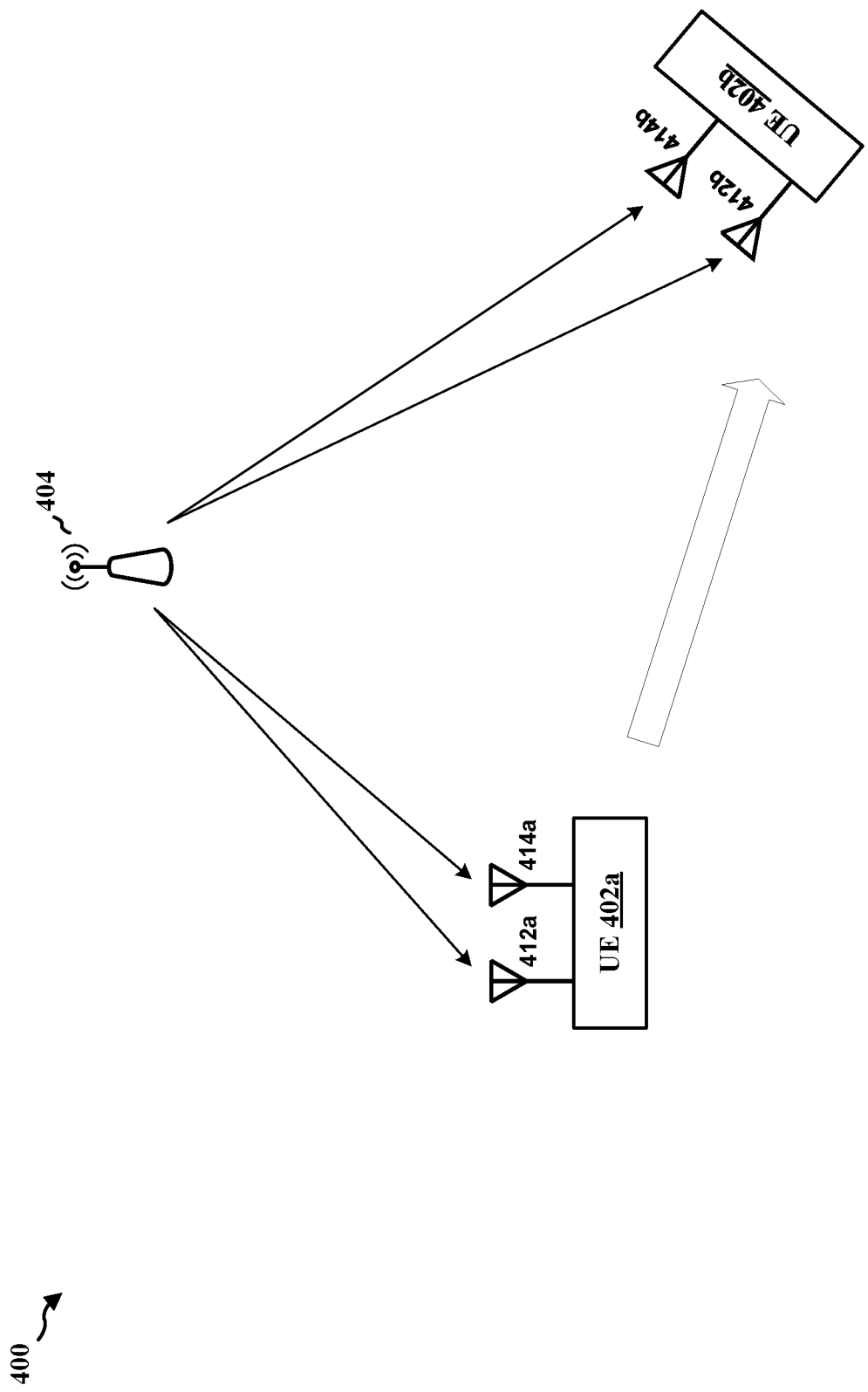
FIG. 4 illustrates an example of wireless communication

FIG. 4 illustrates an example 400 of wireless communication. The example 400 may include a first UE 402a and second UE 402b and a base station 404. The base station 404 may be a base station or a TRP. The first UE 402a and the second UE 402b may be the same UE, at a different position at a different time. For example, the first UE 402a may be in a first position at a specific time t, and the second UE 402a may be in a second position after a measuring period T, e.g., at t+T. The first UE 402a may include at least two or more antenna/beam ports. For example, the first UE 402a may include a first antenna 412a and a second antenna 414a. The first antenna 412a of the first UE 402a may receive a first baseband signal $b_0$, and the second antenna 414a of the first UE 402a may receive a second baseband signal $b_1$ from the base station 404.

The first UE 402a may be moved to another position, i.e., the second UE 402b. That is, the second UE 402b illustrates the 402a moved to another position. The second UE 402b may have a different location and have a different orientation than the first UE 402a with reference to the base station 404. The second UE 402b may include at least two or more antenna/beam ports. For example, the second UE 402b may include a first antenna 412b and a second antenna 414b. The first antenna 412b of the second UE 402b may receive a first baseband signal $b_0$, and the second antenna 414b of the second UE 402b may receive a second baseband signal $b_1$ from the base station 404.

In one aspect, the UE may calculate a variance of a phase delta of a channel to detect the motion of the UE. That is, any movement of the UE may bring changes to the channel environment, and since the channel environment of the baseband signals received at different antenna/beam ports may be differently affected by the UE's movement, the variance of the phase delta of the channel may indicate that the UE may be in motion.

The UE may identify a plurality of phase deltas of at least two baseband signals over the measurement period T. The plurality of phase deltas may include at least one of a baseband phase delta and an analog RF PLL phase delta. Here, the baseband phase delta may represent the phase delta received at the two antenna/beam ports, and the analog RF PLL phase delta may represent the phase delta generated by the UE's RF.

The UE may collect the plurality of phase deltas based on the two baseband signals $b_0$ [t] and $b_1$[t] within a time window of length T, e.g., the measurement period T. The plurality of phase deltas may include the baseband phase delta $\Delta_b$[t] and the analog RF PLL phase delta $\Delta_r$[t]. That is, while the UE in motion may be moved from the first UE 402a in the first position to the second UE 402b in the second position, the UE may identify the plurality of phase deltas between first baseband signal $b_0$ and the second baseband signal $b_1$.

The UE may calculate the phase delta of the channel $\Delta_c$[t] by calculating the difference between the baseband phase delta $\Delta_b$ and the analog RF PLL phase delta $\Delta_r$ [t]. That is, the phase delta of the channel may be calculated based on the following formula: $\Delta_c[t]=\Delta_b[t]-\Delta_r[t]$, where $\Delta_c[t]$ may refer to the at least one phase delta of the at least one channel, $\Delta_b[t]$ may refer to the baseband phase delta, and $\Delta_r[t]$ may refer to the analog RF PLL phase delta. By subtracting the phase delta generated by the UE's RF, i.e., the analog RF PLL phase delta $\Delta_r[t]$, from the phase delta received at the two antenna/beam ports, i.e., the baseband phase delta $\Delta_b[t]$, the UE may calculate the phase delta of the channel.

The UE may unwrap the calculated phase delta of the channel to remove phase transitions between 0 and 360 degrees, i.e., 0 to $2\pi$. Since the phase delta is based on sinusoids without a beginning or an end, one cannot in principle distinguish between the true phase delta and a phase delta with discarded sinusoidal periods when looking at the output of $\Delta_b[t]-\Delta_r[t]$ at any given time within the measurement period T. The phase unwrapping may ensure that all appropriate multiples of $2\pi$ have been included in the calculated phase delta of the channel.

The UE may calculate the variance of the unwrapped phase delta based on the unwrapped phase delta of the channel, and determine whether the UE is in motion or stationary. In some aspects, the UE may determine whether the UE is in motion or stationary based on the variance of the unwrapped phase delta based on the unwrapped phase delta of the channel and at least one threshold value. The at least one threshold value may include a threshold variance value. In one aspect, the UE may determine that the variance is greater than the threshold variance value (variance>threshold variance value), and the UE may decide that the UE is in motion. In another aspect, the UE may determine that the variance is less than or equal to the threshold variance value (variance≤threshold variance value), the UE may decide that the UE is stationary.

In another aspect, the UE may calculate a correlation between the at least two baseband signals over the measurement period T, and the UE may detect the motion based on the calculated correlation. That is, any movement of the UE may bring changes to the channel environment, and since the channel environment of the baseband signals received at different antenna/beam ports may be differently affected by the UE's movement, the correlation between the at least two baseband signals may indicate that the UE is in motion.

The UE may collect the at least two baseband signals, $b_0[t]$, $b_1[t]$, and the analog RF PLL phase delta $\Delta_r[t]$ within a time window of length T. Here, the analog RF PLL phase delta may represent the phase delta generated by the UE's RF. The UE may calculate the correlation between the at least two baseband signals based on the identified at least two baseband signals and the analog RF PLL phase delta. For example, the correlation C between the two baseband signals may be calculated based on the following formula:

$$C=\Sigma_{t=0}^{T-1}b_0[t]b_1^*[t]e^{-j\Delta_r[t]}/(\sqrt{\Sigma_{t=0}^{T-1}\|b_0[t]\|^2}\sqrt{\Sigma_{t=0}^{T-1}\|b_1[t]\|^2}).$$

The UE may calculate the correlation between the two baseband signals and determine whether the UE is in motion or stationary. In some aspects, the UE may determine whether the UE is in motion or stationary based on the correlation between the two baseband signals and at least one threshold value. The at least one threshold value may include a threshold correlation value. In one aspect, the UE may determine that the correlation is less than the threshold correlation value (correlation<threshold correlation value), and the UE may decide that the UE is in motion. In another aspect, the UE may determine that the correlation is greater than or equal to the threshold correlation value (correlation≥threshold correlation value), the UE may decide that the UE is stationary.

In one aspect, the UE may determine that the UE has a high mobility, e.g., in motion, and the UE may determine to decrease the measurement period or increase the measurement frequency for better accuracy. In another aspect, the UE may determine that the UE has a low mobility, e.g., stationary, and the UE may determine to increase the measurement period or decrease the measurement frequency to reserve power and reduce power consumption.

Figure 5:
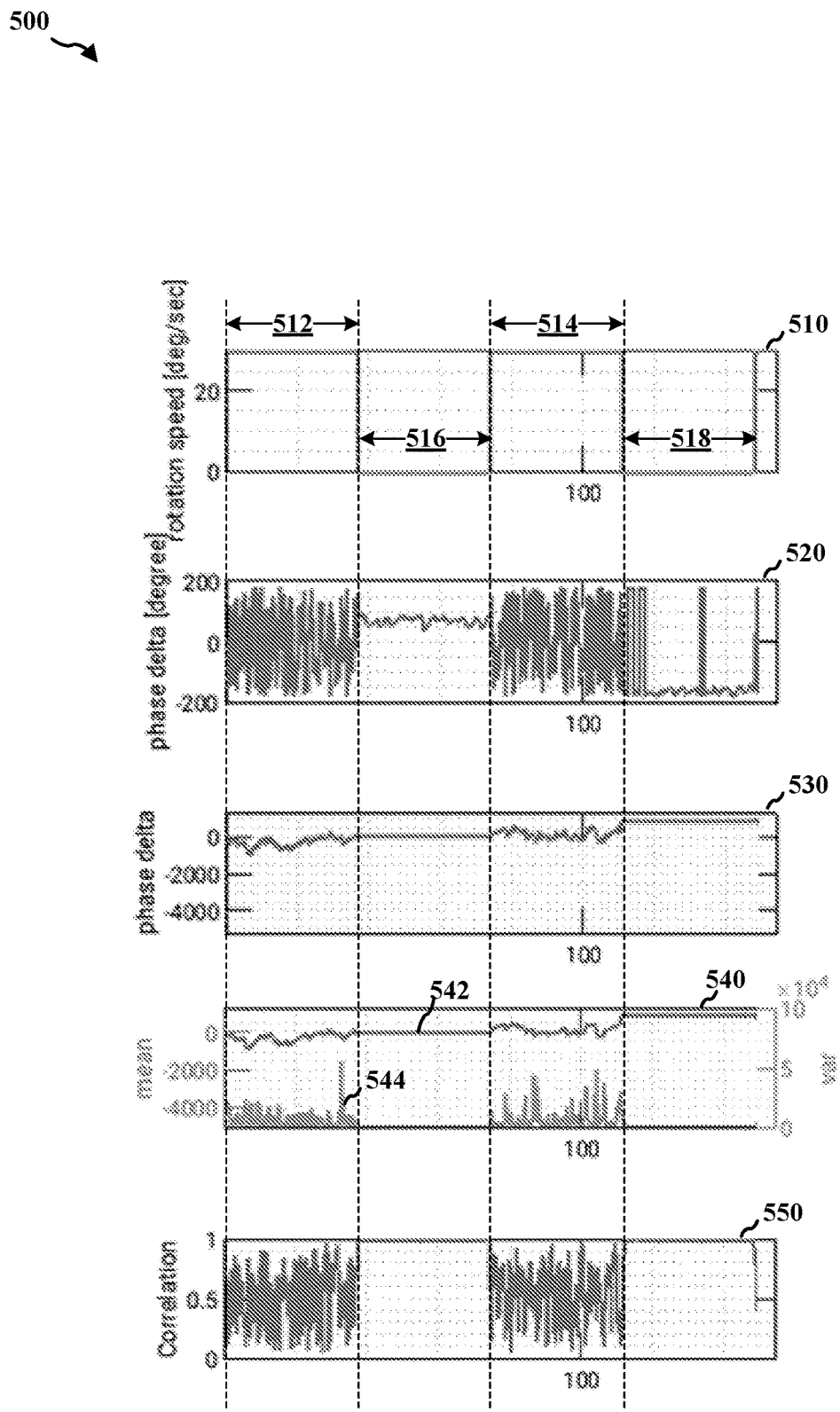
FIG. 5 illustrates a set of measurements of a UE of wireless communication.

FIG. 5 illustrates an example 500 of motion detection of wireless communication. The example 500 includes a plurality of graphs, a first graph 510, a second graph 520, a third graph 530, a fourth graph 540, and a fifth graph 550, illustrating a set of measurements and calculations at a UE, based on the movement of the UE. The first graph 510 shows that the UE may be rotated at 30 deg/sec for every other time period. That is, the UE may be configured to rotate at the speed of 30 deg/sec for a first time period 512 and a third time period 514, and be stationary for a second time period 514 and a fourth time period 518.

The second graph 520 and the third graph 530 show a wrapped phase delta of a channel and an unwrapped phase delta of the channel, respectively. The unwrapped phase delta of the channel of the third graph 530 shows that the unwrapped phase delta of the channel may be maintained substantially unchanged through the second time period 516 and the fourth time period 518 while the UE is stationary.

The fourth graph 540 illustrates the mean value of the unwrapped phase delta of the channel 542 and the variation of the unwrapped phase delta of the channel 544. The fourth graph 540 shows that the variation of the unwrapped phase delta of the channel 544 has a significant value during the first time period 512 and the third time period 514, while the UE may be configured to rotate, and a substantially low value during the second time period 514 and the fourth time period 518, while the UE may be stationary. Accordingly, the UE may determine that the UE is in motion based on the variance being greater than the threshold variance value (variance>threshold variance value), and determine that the UE is stationary based on the variance being less than or equal to the threshold variance value (variance≤threshold variance value).

The fifth graph 550 illustrates the correlation between the two baseband signals. For example, the correlation C may be calculated based on the following formula: $C=\Sigma_{t=0}^{T-1}b_0[t]b_1^*[t]e^{-j\Delta_r[t]}/(\sqrt{\Sigma_{t=0}^{T-1}\|b_0[t]\|^2}\sqrt{\Sigma_{t=0}^{T-1}\|b_1[t]\|^2})$. The fifth graph 550 shows that the correlation between the two baseband signals may be a fluctuating value between 0 to 1 during the first time period 512 and the third time period 514, while the UE may be configured to rotate, and maintain the value substantially close to 1 during the second time period 514 and the fourth time period 518 while the UE may be stationary. Accordingly, the UE may determine that the UE is in motion based on the correlation being less than the threshold correlation value (correlation<threshold correlation value), and determine that the UE is stationary based on the correlation being greater than or equal to the threshold correlation value (correlation≥threshold correlation value).

Figure 6:
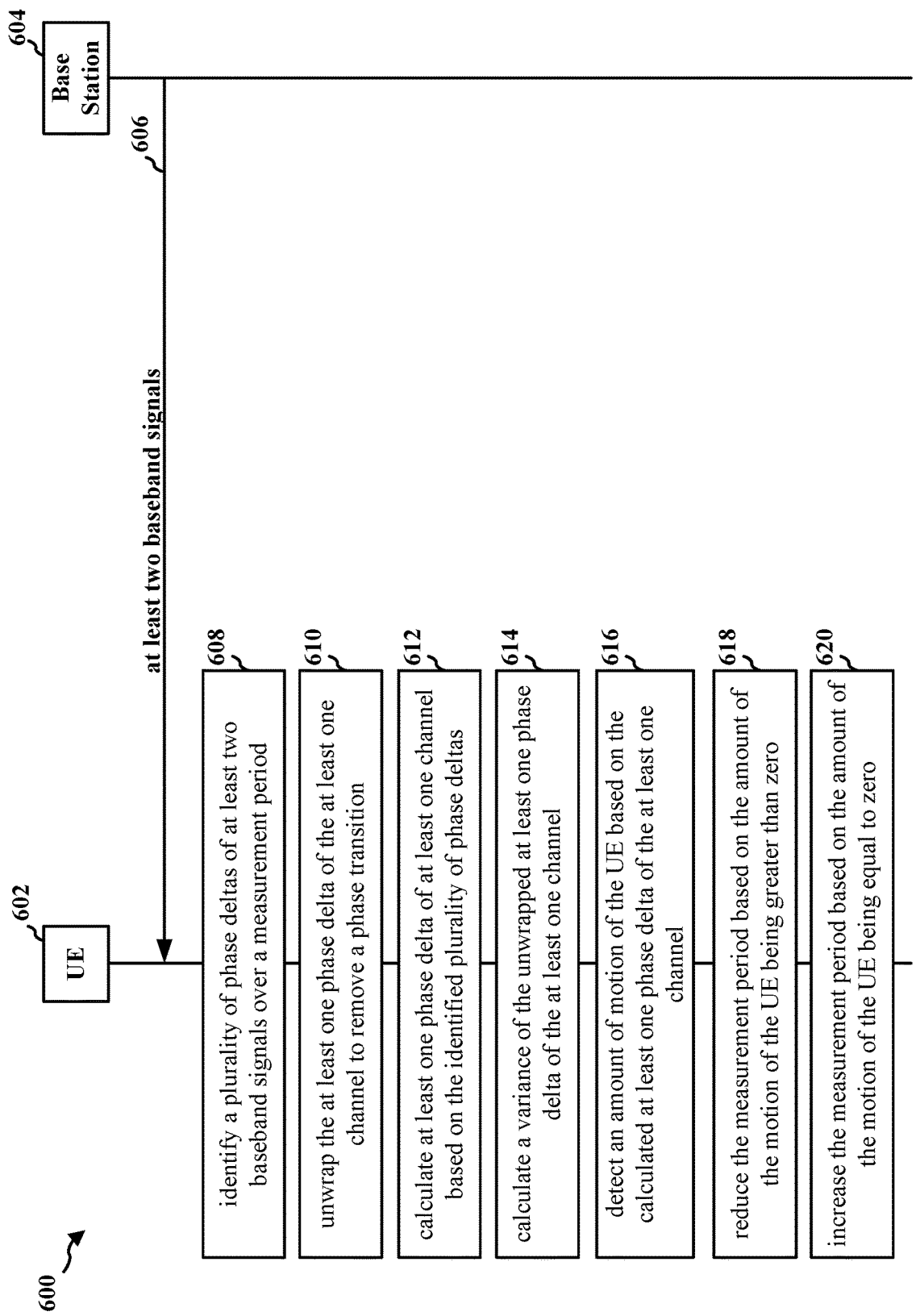
FIG. 6 is a call-flow diagram of a method of wireless communication.

FIG. 6 is a call-flow diagram 600 of a method of wireless communication. The call-flow diagram 600 may include a UE 602 and a base station 604. The UE 602 may receive at least two baseband signals at two or more antenna or beam ports of the UE 602 over the measurement period, and determine an amount of motion of the UE 602 based on a calculated at least one phase delta of the at least one channel.

At 606, the UE 602 may receive, from the base station 604, the at least two baseband signals at two or more antenna or beam ports of the UE 602 over the measurement period. The UE 602 may identify the plurality of phase deltas based on the received at least two baseband signals. In one aspect, the base station 604 may include a base station or a TRP, and the at least two baseband signals are received from the base station or the TRP.

At 608, the UE 602 may identify a plurality of phase deltas of at least two baseband signals over a measurement period. The plurality of phase deltas may be identified based on the received at least two baseband signals at 606. The plurality of phase deltas of the at least two baseband signals may include a baseband phase delta and an analog RF PLL phase delta. The baseband phase delta may represent the phase delta received at the two antenna/beam ports, and the analog RF PLL phase delta may represent the phase delta generated by the RF of the UE 602.

At 610, the UE 602 may unwrap the at least one phase delta of the at least one channel to remove a phase transition. That is, the UE 602 may unwrap the calculated phase delta of the channel to remove phase transitions between 0 and 360 degrees, i.e., 0 to $2\pi$.

At 612, the UE 602 may calculate at least one phase delta of at least one channel based on the identified plurality of phase deltas. The at least one phase delta of the at least one channel is calculated based on the baseband phase delta and the analog RF PLL phase delta. For example, the at least one phase delta of the at least one channel may be calculated based on following formula $\Delta_c[t]=\Delta_b[t]-\Delta_r[t]$, where $\Delta_c[t]$ may refer to the at least one phase delta of the at least one channel, $\Delta_b[t]$ may refer to the baseband phase delta, and $\Delta_r[t]$ may refer to the analog RF PLL phase delta. By subtracting the phase delta generated by the RF of the UE 602, i.e., the analog RF PLL phase delta, from the phase delta received at the two antenna/beam ports, i.e., the baseband phase delta, the UE 602 may calculate the phase delta of the channel.

At 614, the UE 602 may calculate a variance of the unwrapped at least one phase delta of the at least one channel. That is, any movement of the UE 602 may bring changes to the channel environment, and since the channel environment of the baseband signals received at different antenna/beam ports may be differently affected by the movement of the UE 602, the variance of the phase delta of the channel may indicate that the UE 602 may be in motion.

At 616, the UE 602 may detect an amount of motion of the UE 602 based on the calculated at least one phase delta of the at least one channel. Particularly, the UE 602 may detect the amount of the motion of the UE 602 based on the variance of the unwrapped at least one phase delta of the at least one channel being greater than a threshold variance value. In one aspect, the UE 602 may determine that the UE 602 is in motion based on the variance being greater than the threshold variance value (variance>threshold variance value). In another aspect, the UE 602 may determine that the UE 602 is stationary based on the variance being less than or equal to the threshold variance value (variance≤threshold variance value).

At 618, the UE 602 may reduce the measurement period based on the amount of the motion of the UE 602 being greater than zero. That is, the UE 602 may determine that the UE 602 has high mobility, e.g., in motion, based on the amount of the motion of the UE 602 being greater than zero, determine to decrease the measurement period or increase the measurement frequency for better accuracy.

At 620, the UE 602 may increase the measurement period based on the amount of the motion of the UE 602 being equal to zero. That is, the UE 602 may determine that the UE 602 has low mobility, e.g., stationary, based on the amount of the motion of the UE 602 being equal to zero, and determine to increase the measurement period or decrease the measurement frequency to reserve power and reduce power consumption.

Figure 7:
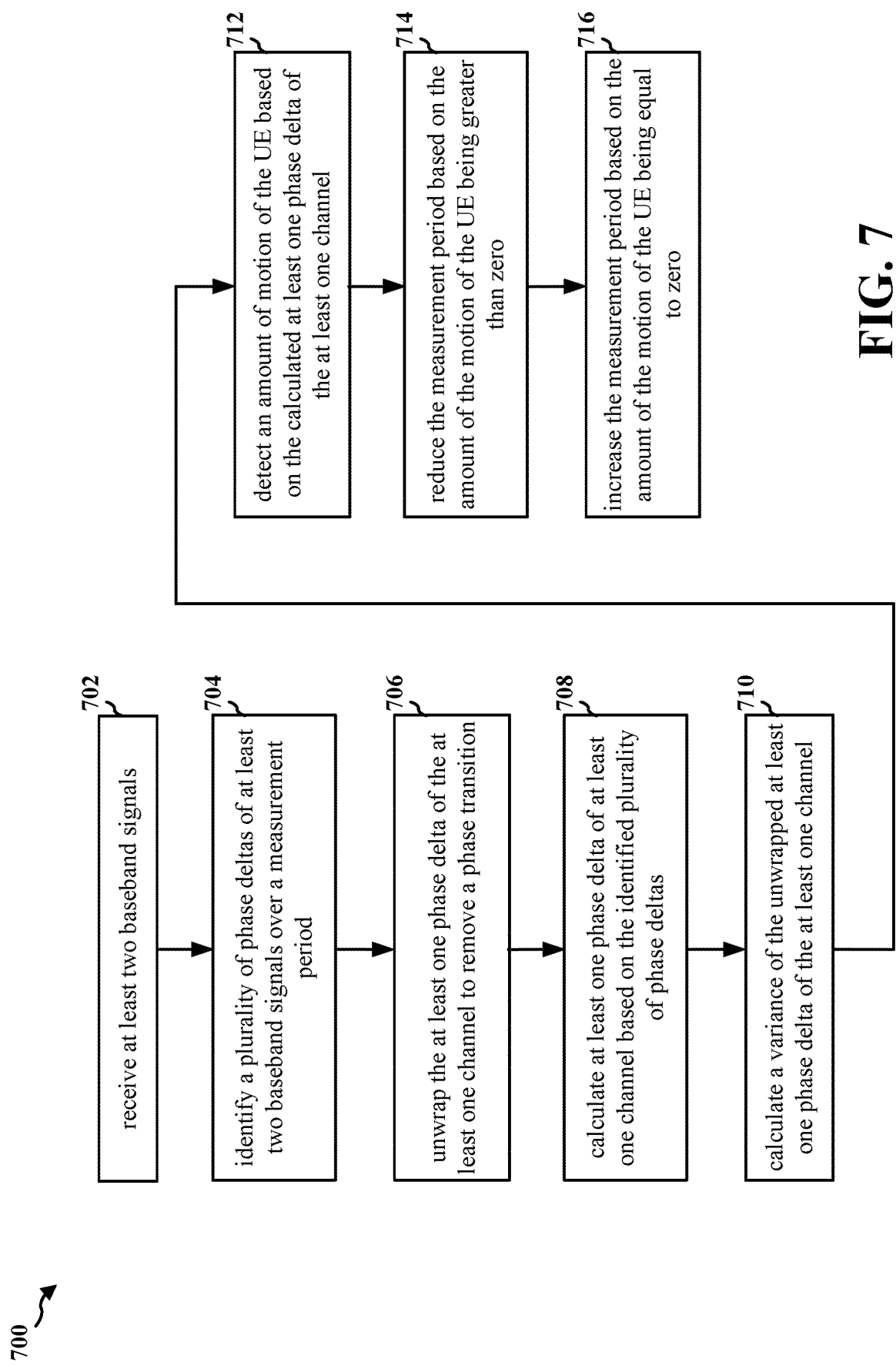
FIG. 7 is a flowchart of a method of wireless communication.

FIG. 7 is a flowchart 700 of a method of wireless communication. The method may be performed by a UE (e.g., the UE 104/402a/402b/602; the apparatus 1202). The UE may receive at least two baseband signals at two or more antenna or beam ports of the UE over the measurement period, and determine an amount of motion of the UE based on a calculated at least one phase delta of the at least one channel.

At 702, the UE may receive, from a base station, the at least two baseband signals at two or more antenna or beam ports of the UE over the measurement period. The UE may identify the plurality of phase deltas based on the received at least two baseband signals. In one aspect, the base station may include a base station or a TRP, and the at least two baseband signals are received from the base station or the TRP. For example, at 606, the UE 602 may receive, from the base station 604, the at least two baseband signals at two or more antenna or beam ports of the UE 602 over the measurement period. Furthermore, 702 may be performed by a reception component 1230.

At 704, the UE may identify a plurality of phase deltas of at least two baseband signals over a measurement period. The plurality of phase deltas may be identified based on the received at least two baseband signals at 702. The plurality of phase deltas of the at least two baseband signals may include a baseband phase delta and an analog RF PLL phase delta. The baseband phase delta may represent the phase delta received at the two antenna/beam ports, and the analog RF PLL phase delta may represent the phase delta generated by the RF of the UE. For example, at 608, the UE 602 may identify a plurality of phase deltas of at least two baseband signals over a measurement period. Furthermore, 704 may be performed by a phase delta component 1240.

At 706, the UE may unwrap the at least one phase delta of the at least one channel to remove a phase transition. That is, the UE may unwrap the calculated phase delta of the channel to remove phase transitions between 0 and 360 degrees, i.e., 0 to 2π. For example, at 610, the UE 602 may unwrap the at least one phase delta of the at least one channel to remove a phase transition. Furthermore, 706 may be performed by the phase delta component 1240.

At 708, the UE may calculate at least one phase delta of at least one channel based on the identified plurality of phase deltas. The at least one phase delta of the at least one channel is calculated based on the baseband phase delta and the analog RF PLL phase delta. For example, the at least one phase delta of the at least one channel may be calculated based on following formula $\Delta_c[t]=\Delta_b[t]-\Delta_r[t]$, where $\Delta_c[t]$ may refer to the at least one phase delta of the at least one channel, $\Delta_b[t]$ may refer to the baseband phase delta, and $\Delta_r[t]$ may refer to the analog RF PLL phase delta. By subtracting the phase delta generated by the RF of the UE, i.e., the analog RF PLL phase delta, from the phase delta received at the two antenna/beam ports, i.e., the baseband phase delta, the UE may calculate the phase delta of the channel. For example, at 612, the UE 602 may calculate at least one phase delta of at least one channel based on the identified plurality of phase deltas. Furthermore, 708 may be performed by the phase delta component 1240.

At 710, the UE may calculate a variance of the unwrapped at least one phase delta of the at least one channel. That is, any movement of the UE may bring changes to the channel environment, and since the channel environment of the baseband signals received at different antenna/beam ports may be differently affected by the movement of the UE, the variance of the phase delta of the channel may indicate that the UE may be in motion. For example, at 614, the UE 602 may calculate a variance of the unwrapped at least one phase delta of the at least one channel. Furthermore, 710 may be performed by the phase delta component 1240.

At 712, the UE may detect an amount of motion of the UE based on the calculated at least one phase delta of the at least one channel. Particularly, the UE may detect the amount of the motion of the UE based on the variance of the unwrapped at least one phase delta of the at least one channel being greater than a threshold variance value. In one aspect, the UE may determine that the UE is in motion based on the variance being greater than the threshold variance value variance>threshold variance value). In another aspect, the UE may determine that the UE is stationary based on the variance being less than or equal to the threshold variance value (variance≤threshold variance value). For example, at 616, the UE 602 may detect an amount of motion of the UE 602 based on the calculated at least one phase delta of the at least one channel. Furthermore, 712 may be performed by a motion detection component 1244.

At 714, the UE may reduce the measurement period based on the amount of the motion of the UE 602 being greater than zero. That is, the UE may determine that the UE has high mobility, e.g., in motion, based on the amount of the motion of the UE being greater than zero, determine to decrease the measurement period or increase the measurement frequency for better accuracy. For example, at 618, the UE 602 may reduce the measurement period based on the amount of the motion of the UE 602 being greater than zero. Furthermore, 714 may be performed by a measurement period managing component 1246.

At 716, the UE may increase the measurement period based on the amount of the motion of the UE being equal to zero. That is, the UE may determine that the UE has low mobility, e.g., stationary, based on the amount of the motion of the UE being equal to zero, and determine to increase the measurement period or decrease the measurement frequency to reserve power and reduce power consumption. For example, at 620, the UE 602 may increase the measurement period based on the amount of the motion of the UE 602 being equal to zero. Furthermore, 716 may be performed by the measurement period managing component 1246.

Figure 8:
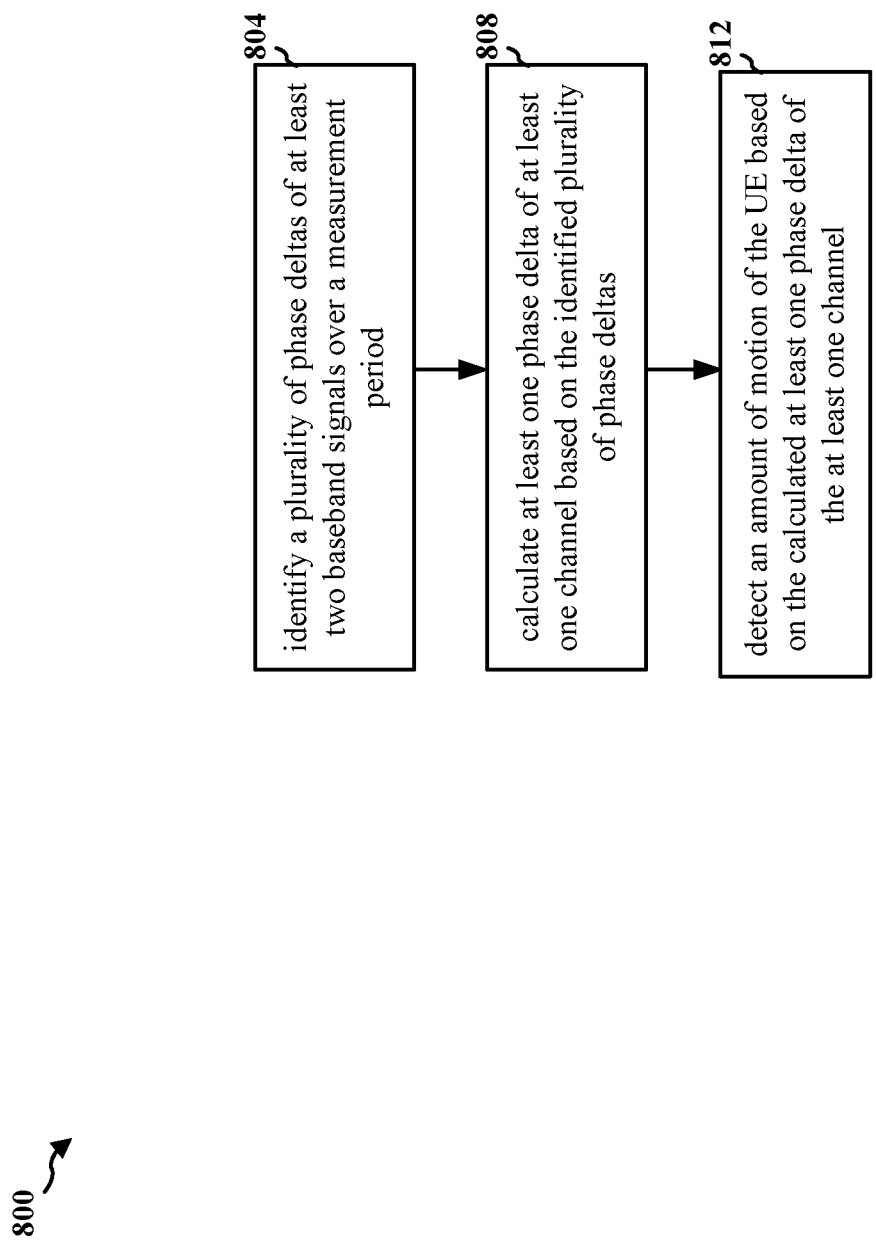
FIG. 8 is a flowchart of a method of wireless communication.

FIG. 8 is a flowchart 800 of a method of wireless communication. The UE may receive at least two baseband signals at two or more antenna or beam ports of the UE over the measurement period, and determine an amount of motion of the UE based on a calculated at least one phase delta of the at least one channel.

At 804, the UE may identify a plurality of phase deltas of at least two baseband signals over a measurement period. The plurality of phase deltas may be identified based on the received at least two baseband signals at 802. The plurality of phase deltas of the at least two baseband signals may include a baseband phase delta and an analog RF PLL phase delta. The baseband phase delta may represent the phase delta received at the two antenna/beam ports, and the analog RF PLL phase delta may represent the phase delta generated by the RF of the UE. For example, at 608, the UE 602 may identify a plurality of phase deltas of at least two baseband signals over a measurement period. Furthermore, 804 may be performed by a phase delta component 1240.

At 808, the UE may calculate at least one phase delta of at least one channel based on the identified plurality of phase deltas. The at least one phase delta of the at least one channel is calculated based on the baseband phase delta and the analog RF PLL phase delta. For example, the at least one phase delta of the at least one channel may be calculated based on following formula $\Delta_c[t]=\Delta_b[t]-\Delta_r[t]$, where $\Delta_c[t]$ may refer to the at least one phase delta of the at least one channel, $\Delta_b[t]$ may refer to the baseband phase delta, and $\Delta_r[t]$ may refer to the analog RF PLL phase delta. By subtracting the phase delta generated by the RF of the UE, i.e., the analog RF PLL phase delta, from the phase delta received at the two antenna/beam ports, i.e., the baseband phase delta, the UE may calculate the phase delta of the channel. For example, at 612, the UE 602 may calculate at least one phase delta of at least one channel based on the identified plurality of phase deltas. Furthermore, 808 may be performed by the phase delta component 1240.

At 812, the UE may detect an amount of motion of the UE based on the calculated at least one phase delta of the at least one channel. Particularly, the UE may detect the amount of the motion of the UE based on the variance of the unwrapped at least one phase delta of the at least one channel being greater than a threshold variance value. In one aspect, the UE may determine that the UE is in motion based on the variance being greater than the threshold variance value variance>threshold variance value). In another aspect, the UE may determine that the UE is stationary based on the variance being less than or equal to the threshold variance value (variance≤threshold variance value). For example, at 616, the UE 602 may detect an amount of motion of the UE 602 based on the calculated at least one phase delta of the at least one channel. Furthermore, 812 may be performed by a motion detection component 1244.

Figure 9:
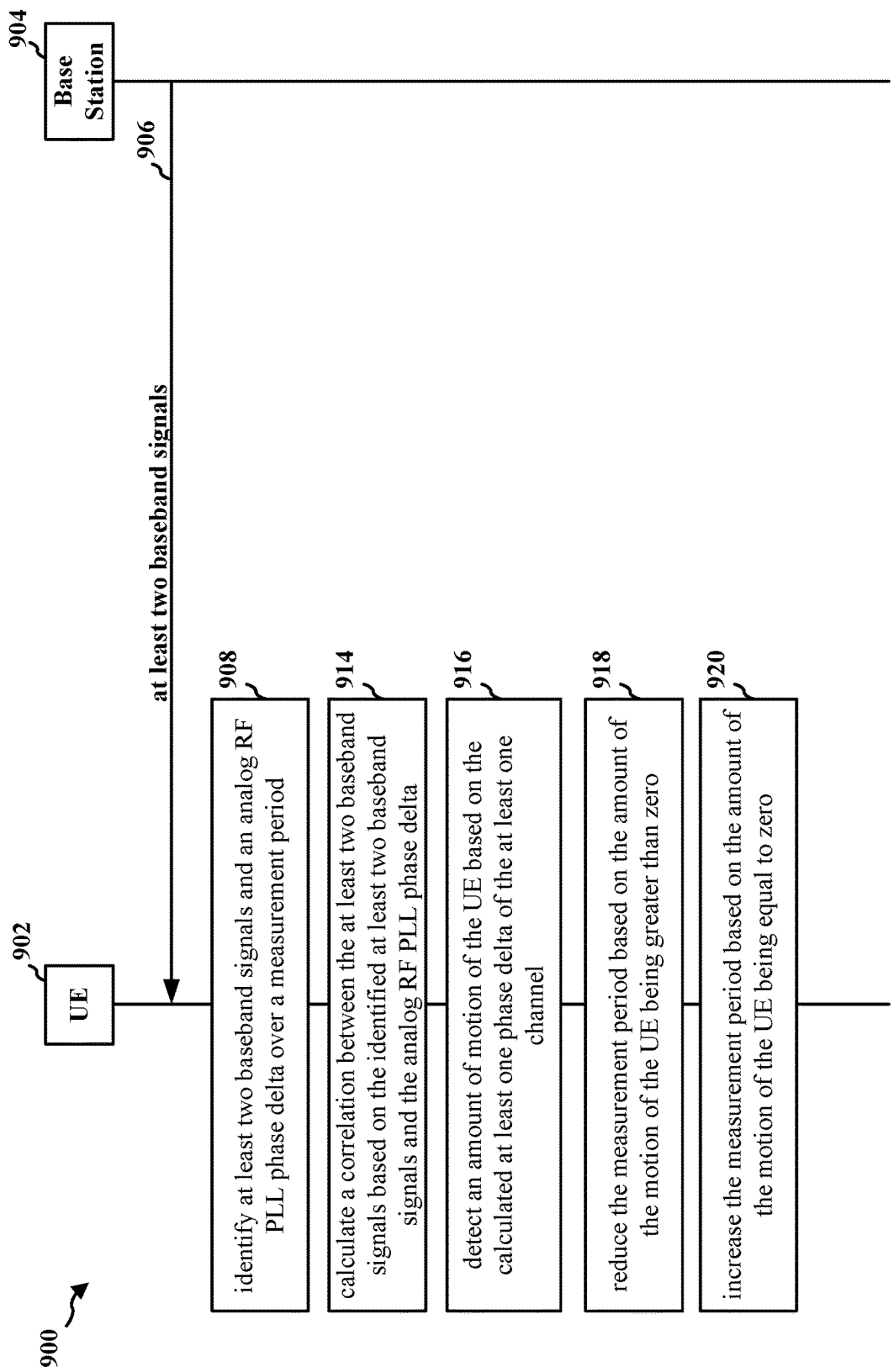
FIG. 9 is a call-flow diagram of a method of wireless communication.

FIG. 9 is a call-flow diagram 900 of a method of wireless communication. The call-flow diagram 900 may include a UE 902 and a base station 904. The UE 902 may receive at least two baseband signals at two or more antenna or beam ports of the UE 902 over the measurement period, and determine an amount of motion of the UE 902 based on a calculated correlation between the at least two baseband signals.

At 906, the UE 902 may receive, from the base station 904, the at least two baseband signals at two or more antenna or beam ports of the UE 902 over the measurement period. The UE 902 may identify the plurality of phase deltas based on the received at least two baseband signals. In one aspect, the base station 904 may include a base station or a TRP, and the at least two baseband signals are received from the base station or the TRP.

At 908, the UE 902 may identify at least two baseband signals and an analog RF PLL phase delta over a measurement period. That is, the UE 902 may collect the at least two baseband signals and the analog RF PLL phase delta within a time window of length T. The analog RF PLL phase delta may represent the phase delta generated by the RF of the UE 902.

At 914, the UE 902 may calculate a correlation between the at least two baseband signals based on the identified at least two baseband signals and the analog RF PLL phase delta. In one aspect, the UE 902 may calculate the correlation between the at least two baseband signals based on the identified at least two baseband signals and the analog RF PLL phase delta. For example, the correlation C between the two baseband signals may be calculated based on following formula: $C=\Sigma_{t=0}^{T-1} b_0[t] b_1^*[t] e^{-j\Delta_r[t]} / (\sqrt{\Sigma_{t=0}^{T-1} \|b_0[t]\|^2} \sqrt{\Sigma_{t=0}^{T-1} \|b_1[t]\|^2})$.

At 916, the UE 902 may detect an amount of motion of the UE 902 based on the calculated correlation. Particularly, the UE 902 may detect the amount of the motion of the UE 902 based on the correlation between the at least two baseband signals being smaller than a threshold variance value. That is, any movement of the UE 902 may bring changes to the channel environment, and since the channel environment of the baseband signals received at different antenna/beam ports may be differently affected by the movement of the UE 902, the correlation between the at least two baseband signals may indicate that the UE 902 is in motion. In one aspect, the UE 902 may determine that the UE 902 is in motion based on the correlation being less than the threshold variance value (variance<threshold variance value). In another aspect, the UE 902 may determine that the UE 902 is stationary based on the correlation being greater than or equal to the threshold variance value (variance≥threshold variance value).

At 918, the UE 902 may reduce the measurement period based on the amount of the motion of the UE 902 being greater than zero. That is, the UE 902 may determine that the UE 902 has high mobility, e.g., in motion, based on the amount of the motion of the UE 902 being greater than zero, determine to decrease the measurement period or increase the measurement frequency for better accuracy.

At 920, the UE 902 may increase the measurement period based on the amount of the motion of the UE 902 being equal to zero. That is, the UE 902 may determine that the UE 902 has low mobility, e.g., stationary, based on the amount of the motion of the UE 902 being equal to zero, and determine to increase the measurement period or decrease the measurement frequency to reserve power and reduce power consumption.

Figure 10:
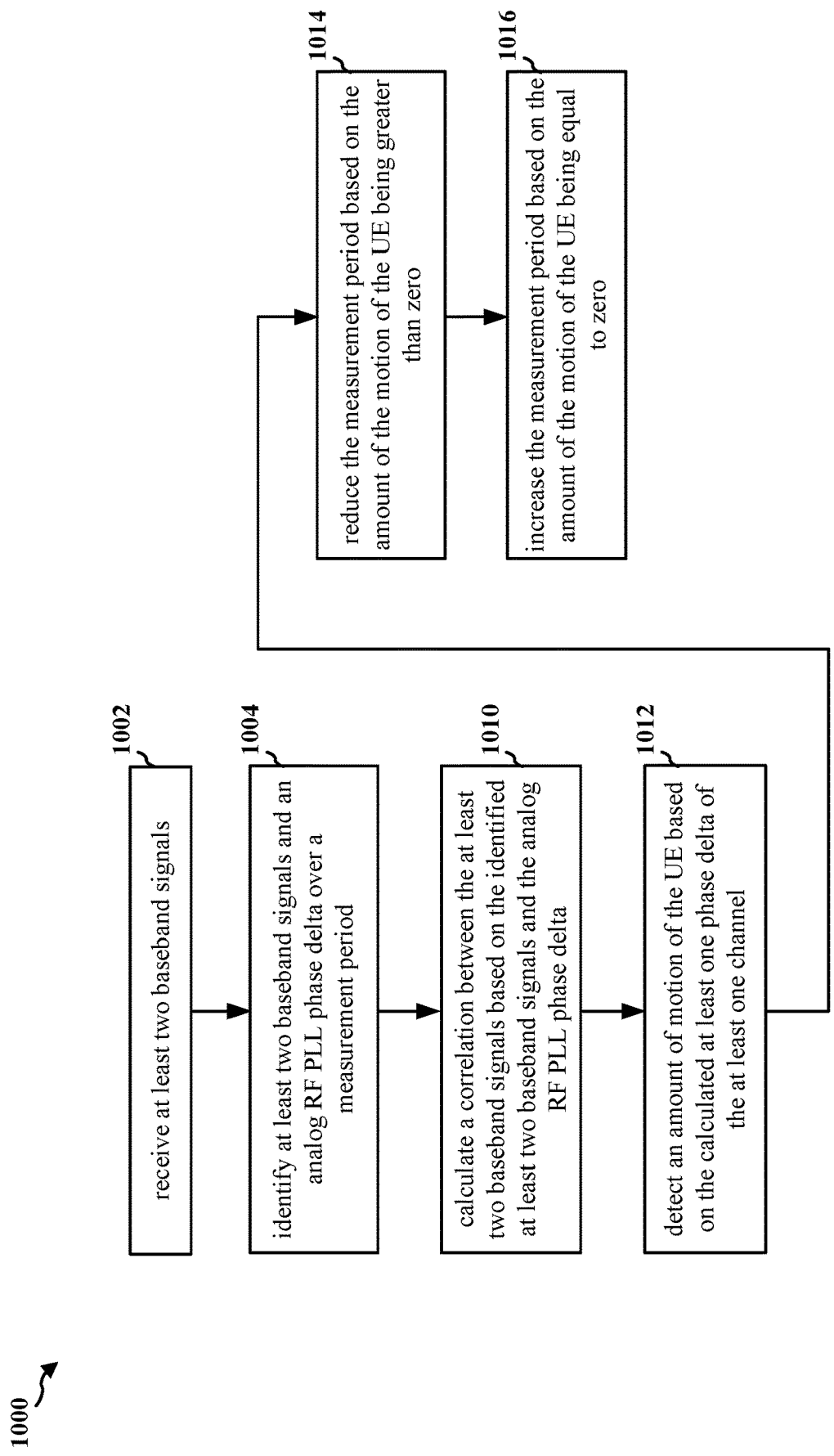
FIG. 10 is a flowchart of a method of wireless communication.

FIG. 10 is a flowchart 1000 of a method of wireless communication. The method may be performed by a UE (e.g., the UE 104/402a/402b/602; the apparatus 1202). The UE may receive at least two baseband signals at two or more antenna or beam ports of the UE over the measurement period, and determine an amount of motion of the UE based on a calculated correlation between the at least two baseband signals.

At 1002, the UE may receive, from a base station, the at least two baseband signals at two or more antenna or beam ports of the UE over the measurement period. The UE may identify the plurality of phase deltas based on the received at least two baseband signals. In one aspect, the base station may include a base station or a TRP, and the at least two baseband signals are received from the base station or the TRP. For example, at 906, the UE 902 may receive, from the base station 904, the at least two baseband signals at two or more antenna or beam ports of the UE 902 over the measurement period. Furthermore, 1002 may be performed by a reception component 1230.

At 1004, the UE may identify at least two baseband signals and an analog RF PLL phase delta over a measurement period. That is, the UE may collect the at least two baseband signals and the analog RF PLL phase delta within a time window of length T. The analog RF PLL phase delta may represent the phase delta generated by the RF of the UE. For example, at 908, the UE 902 may identify at least two baseband signals and an analog RF PLL phase delta over a measurement period. Furthermore, 1004 may be performed by a correlation component 1242.

At 1010, the UE may calculate a correlation between the at least two baseband signals based on the identified at least two baseband signals and the analog RF PLL phase delta. In one aspect, the UE may calculate the correlation between the at least two baseband signals based on the identified at least two baseband signals and the analog RF PLL phase delta. For example, the correlation C between the two baseband signals may be calculated based on following formula: $C = \sum_{t=0}^{T-1} b_0[t] b_1^*[t] e^{-j\Delta_r[t]} / (\sqrt{\sum_{t=0}^{T-1} \|b_0[t]\|^2} \sqrt{\sum_{t=0}^{T-1} \|b_1[t]\|^2})$. For example, at 914, the UE 902 may calculate a correlation between the at least two baseband signals based on the identified at least two baseband signals and the analog RF PLL phase delta. Furthermore, 1010 may be performed by a correlation component 1242.

At 1012, the UE may detect an amount of motion of the UE based on the calculated correlation. Particularly, the UE may detect the amount of the motion of the UE based on the correlation between the at least two baseband signals being smaller than a threshold correlation value. That is, any movement of the UE may bring changes to the channel environment, and since the channel environment of the baseband signals received at different antenna/beam ports may be differently affected by the movement of the UE, the correlation between the at least two baseband signals may indicate that the UE is in motion. In one aspect, the UE may determine that the UE is in motion based on the correlation being less than the threshold correlation value (correlation<threshold correlation value). In another aspect, the UE may determine that the UE is stationary based on the correlation being greater than or equal to the threshold correlation value (correlation≥threshold correlation value). For example, at 916, the UE 902 may detect an amount of motion of the UE 902 based on the calculated correlation. Furthermore, 1012 may be performed by a motion detection component 1244.

At 1014, the UE may reduce the measurement period based on the amount of the motion of the UE being greater than zero. That is, the UE may determine that the UE has high mobility, e.g., in motion, based on the amount of the motion of the UE being greater than zero, determine to decrease the measurement period or increase the measurement frequency for better accuracy. For example, at 918, the UE 902 may reduce the measurement period based on the amount of the motion of the UE 902 being greater than zero. Furthermore, 1014 may be performed by a measurement period managing component 1246.

At 1016, the UE may increase the measurement period based on the amount of the motion of the UE being equal to zero. That is, the UE may determine that the UE has low mobility, e.g., stationary, based on the amount of the motion of the UE being equal to zero, and determine to increase the measurement period or decrease the measurement frequency to reserve power and reduce power consumption. For example, at 920, the UE 902 may increase the measurement period based on the amount of the motion of the UE 902 being equal to zero. Furthermore, 1016 may be performed by the measurement period managing component 1246.

Figure 11:
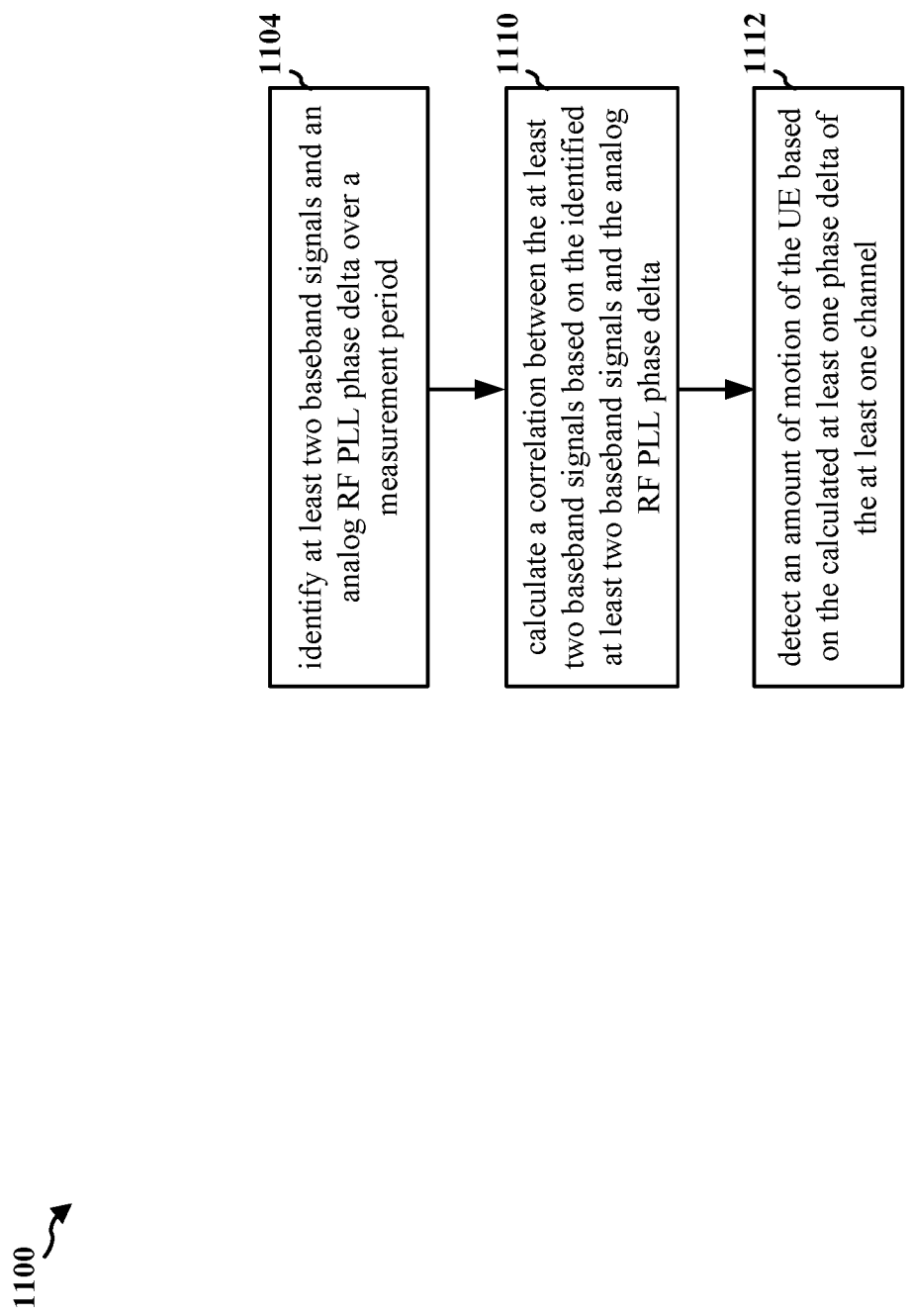
FIG. 11 is a flowchart of a method of wireless communication.

FIG. 11 is a flowchart 1100 of a method of wireless communication. The UE may receive at least two baseband signals at two or more antenna or beam ports of the UE over the measurement period, and determine an amount of motion of the UE based on a calculated correlation between the at least two baseband signals.

At 1104, the UE may identify at least two baseband signals and an analog RF PLL phase delta over a measurement period. That is, the UE may collect the at least two baseband signals and the analog RF PLL phase delta within a time window of length T. The analog RF PLL phase delta may represent the phase delta generated by the RF of the UE. For example, at 908, the UE 902 may identify at least two baseband signals and an analog RF PLL phase delta over a measurement period. Furthermore, 1104 may be performed by a correlation component 1242.

At 1110, the UE may calculate a correlation between the at least two baseband signals based on the identified at least two baseband signals and the analog RF PLL phase delta. In one aspect, the UE may calculate the correlation between the at least two baseband signals based on the identified at least two baseband signals and the analog RF PLL phase delta. For example, the correlation C between the two baseband signals may be calculated based on following formula: $C = \sum_{t=0}^{T-1} b_0[t] b_1^*[t] e^{-j\Delta_r[t]} / (\sqrt{\sum_{t=0}^{T-1} \|b_0[t]\|^2} \sqrt{\sum_{t=0}^{T-1} \|b_1[t]\|^2})$. For example, at 914, the UE 902 may calculate a correlation between the at least two baseband signals based on the identified at least two baseband signals and the analog RF PLL phase delta. Furthermore, 1110 may be performed by a correlation component 1242.

At 1112, the UE may detect an amount of motion of the UE based on the calculated correlation. Particularly, the UE may detect the amount of the motion of the UE based on the correlation between the at least two baseband signals being smaller than a threshold correlation value. That is, any movement of the UE may bring changes to the channel environment, and since the channel environment of the baseband signals received at different antenna/beam ports may be differently affected by the movement of the UE, the correlation between the at least two baseband signals may indicate that the UE is in motion. In one aspect, the UE may determine that the UE is in motion based on the correlation being less than the threshold correlation value (correlation<threshold correlation value). In another aspect, the UE may determine that the UE is stationary based on the correlation being greater than or equal to the threshold correlation value (correlation≥threshold correlation value). For example, at 916, the UE 902 may detect an amount of motion of the UE 902 based on the calculated correlation. Furthermore, 1112 may be performed by a motion detection component 1244.

Figure 12:
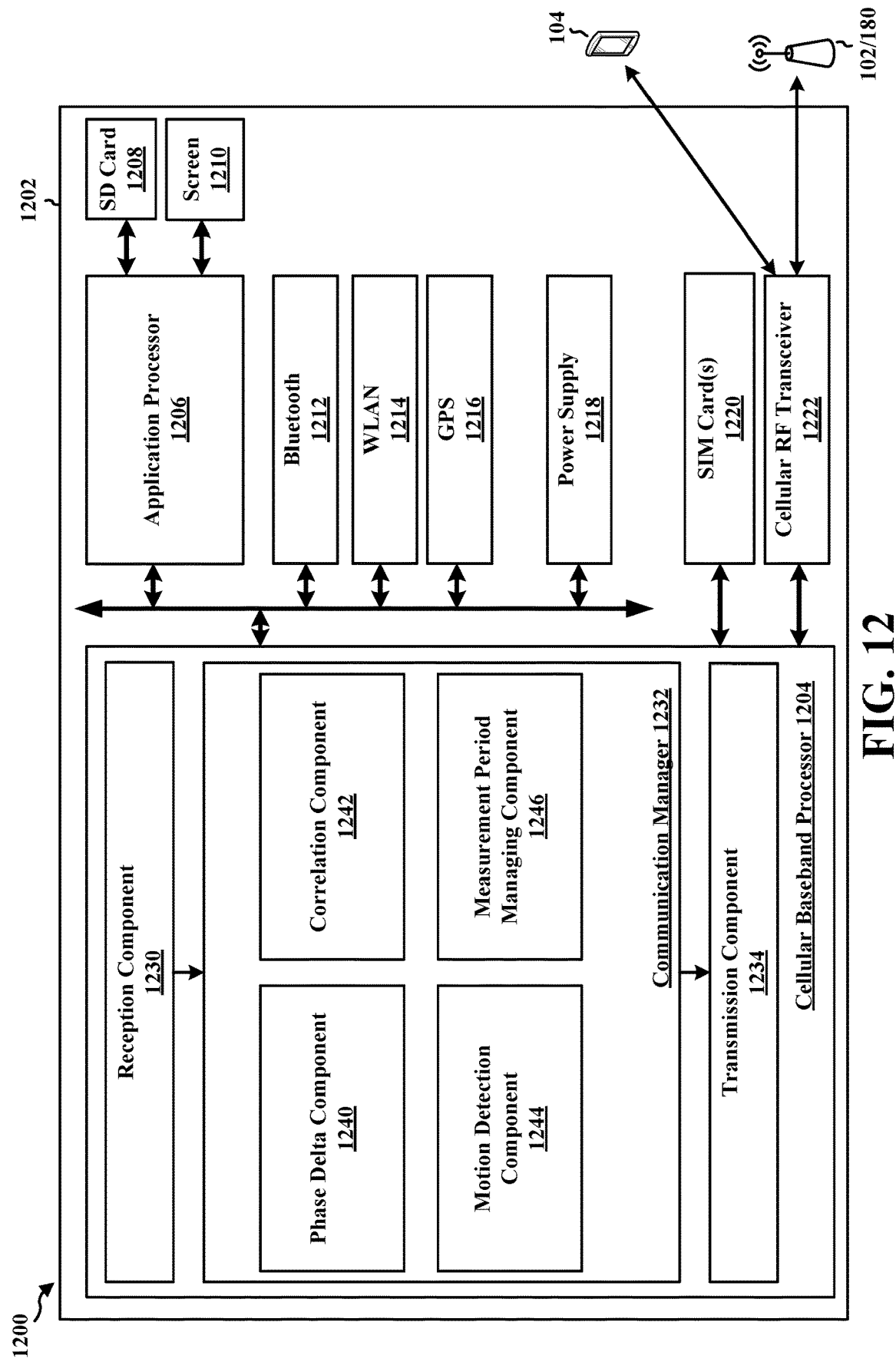
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 includes a phase delta component 1240 that is configured to identify a plurality of phase deltas of at least two baseband signals over a measurement period, unwrap the at least one phase delta of the at least one channel to remove a phase transition, calculate at least one phase delta of at least one channel based on the identified plurality of phase deltas, and calculate a variance of the unwrapped at least one phase delta of the at least one channel, e.g., as described in connection with 704, 706, 708, 710, 804, and 808. The communication manager 1232 further includes a correlation component 1242 that is configured to identify at least two baseband signals and an analog RF PLL phase delta over a measurement period, and calculate a correlation between the at least two baseband signals based on the identified at least two baseband signals and the analog RF PLL phase delta, e.g., as described in connection with 1004, 1010, 1104, and 1110. The communication manager 1232 includes a motion detection component 1244 that is configured to detect an amount of motion of the UE based on the calculated at least one phase delta of the at least one channel or the calculated correlation, e.g., as described in connection with 712, 812, 1012, and 1112. The communication manager 1232 further includes a measurement period managing component 1246 that is configured to reduce or increase the measurement period based on the amount of the motion of the UE, e.g., as described in connection with 714, 716, 1014, and 1016.

The apparatus may include additional components that perform each of the blocks of the algorithm in the flowcharts of FIGS. 6, 7, 8, 9, 10, and 11. As such, each block in the flowcharts of FIGS. 6, 7, 8, 9, 10, and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes means for identifying a plurality of phase deltas of at least two baseband signals over a measurement period, means for calculating at least one phase delta of at least one channel based on the identified plurality of phase deltas, and means for detecting an amount of motion of the UE based on the calculated at least one phase delta of the at least one channel. The apparatus 1202 includes means for unwrapping the at least one phase delta of the at least one channel to remove a phase transition and means for calculating a variance of the unwrapped at least one phase delta of the at least one channel. The apparatus 1202 includes means for identifying at least two baseband signals and an analog RF PLL phase delta over a measurement period, means for calculating a correlation between the at least two baseband signals based on the identified at least two baseband signals and the analog RF PLL phase delta, and means for detecting an amount of motion of the UE based on the calculated correlation. The apparatus 1202 includes means for receiving the at least two baseband signals at two or more antenna or beam ports of the UE over the measurement period. The apparatus 1202 includes means for reducing the measurement period based on the amount of the motion of the UE being greater than zero or means for increasing the measurement period based on the amount of the motion of the UE being equal to zero. The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

A UE may receive at least two baseband signals at two or more antenna or beam ports of the UE over a measurement period, and determine an amount of motion of the UE based on the received at least two baseband signals. In one aspect, the amount of motion of the UE may be determined based on at least one phase delta of the at least one channel. The UE may identify a plurality of phase deltas of at least two baseband signals over a measurement period, the plurality of phase deltas including a baseband phase delta and an analog RF PLL phase delta. The UE may calculate and unwrap at least one phase delta of at least one channel based on the identified plurality of phase deltas, and detect an amount of motion of the UE based on a variation of the at least one phase delta of at least one channel. That is, the UE may determine that the variance is greater than the threshold variance value or that the variance is less than or equal to the threshold variance value. In another aspect, the amount of motion of the UE may be determined based on a correlation between the at least two baseband signals. The UE may identify at least two baseband signals and an analog RF PLL phase delta over a measurement period, and calculate a correlation between the at least two baseband signals based on the identified at least two baseband signals and the analog RF PLL phase delta. the UE may detect an amount of motion of the UE based on the calculated correlation. That is, the UE may determine that the UE is in motion based on the correlation being less than the threshold correlation value, and that the UE is stationary based on the correlation being greater than or equal to the threshold correlation value.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to identify a plurality of phase deltas of at least two baseband signals over a measurement period, calculate at least one phase delta of at least one channel based on the identified plurality of phase deltas, and detect an amount of motion of the UE based on the calculated at least one phase delta of the at least one channel.

Aspect 2 is the apparatus of aspect 1, where the at least one processor and the memory are further configured to receive the at least two baseband signals at two or more antenna or beam ports of the UE over the measurement period, where the plurality of phase deltas is identified based on the received at least two baseband signals.

Aspect 3 is the apparatus of aspect 2, where the at least two baseband signals are received from a base station or a TRP.

Aspect 4 is the apparatus of any of aspects 1 to 3, where the plurality of phase deltas of the at least two baseband signals includes a baseband phase delta and an analog RF PLL phase delta, and the at least one phase delta of the at least one channel is calculated based on the baseband phase delta and the analog RF PLL phase delta.

Aspect 5 is the apparatus of aspect 4, where the at least one phase delta of the at least one channel is calculated based on following formula $\Delta_c[t]=\Delta_b[t]-\Delta_r[t]$, where $\Delta_c[t]$ refers to the at least one phase delta of the at least one channel, $\Delta_b[t]$ refers to the baseband phase delta, and $\Delta_r[t]$ refers to the analog RF PLL phase delta.

Aspect 6 is the apparatus of any of aspects 4 and 5, where the at least one processor and the memory are further configured to unwrap the at least one phase delta of the at least one channel to remove a phase transition.

Aspect 7 is the apparatus of any of aspects 4 to 6, where the at least one processor and the memory are further configured to calculate a variance of the at least one phase delta of the at least one channel, and the at least one processor and the memory detect the amount of the motion of the UE based on the variance of the at least one phase delta of the at least one channel being greater than a threshold variance value.

Aspect 8 is the apparatus of any of aspects 1 to 7, where the at least one processor and the memory are further configured to reduce the measurement period based on the amount of the motion of the UE being greater than zero.

Aspect 9 is the apparatus of any of aspects 1 to 8, where the at least one processor and the memory are further configured to increase the measurement period based on the amount of the motion of the UE being equal to zero.

Aspect 10 is the apparatus of any of aspects 1 to 9, further including a transceiver coupled to the at least one processor, where the plurality of phase deltas is identified at two or more antenna or beam ports of the UE.

Aspect 11 is a method of wireless communication for implementing any of aspects 1 to 10.

Aspect 12 is an apparatus for wireless communication including means for implementing any of aspects 1 to 10.

Aspect 13 is a computer-readable medium storing computer executable code, where the code when executed by a processor causes the processor to implement any of aspects 1 to 10.

Aspect 14 is an apparatus for wireless communication including at least one processor coupled to a memory and configured to identify at least two baseband signals and an analog RF PLL phase delta over a measurement period, calculate a correlation between the at least two baseband signals based on the identified at least two baseband signals and the analog RF PLL phase delta, and detect an amount of motion of the UE based on the calculated correlation.

Aspect 15 is the apparatus of aspect 14, where the at least one processor and the memory are further configured to receive the at least two baseband signals at two or more antenna or beam ports of the UE over the measurement period, where the at least two baseband signals are identified based on the received at least two baseband signals.

Aspect 16 is the apparatus of aspect 15, where the at least two baseband signals are received from a base station or a TRP.

Aspect 17 is the apparatus of any of aspects 14 to 16, where the at least one processor and the memory further detect the amount of the motion of the UE based on the correlation between the at least two baseband signals being smaller than a threshold correlation value.

Aspect 18 is the apparatus of any of aspects 14 to 17, where the at least one processor and the memory are further configured to reduce the measurement period based on the amount of the motion of the UE being greater than zero.

Aspect 19 is the apparatus of any of aspects 14 to 18, where the at least one processor and the memory are further configured to increase the measurement period based on the amount of the motion of the UE being equal to zero.

Aspect 20 is the apparatus of any of aspects 14 to 19, further including a transceiver coupled to the at least one processor, where the at least two baseband signals are identified at two or more antenna or beam ports of the UE Aspect 21 is a method of wireless communication for implementing any of aspects 14 to 20.

Aspect 22 is an apparatus for wireless communication including means for implementing any of aspects 14 to 20.

Aspect 23 is a computer-readable medium storing computer executable code, where the code when executed by a processor causes the processor to implement any of aspects 14 to 20.

What is claimed is:

1. An apparatus for wireless communication at a user equipment (UE), comprising:
   a memory; and
   at least one processor coupled to the memory and configured to:
   identify a plurality of phase deltas of at least two baseband signals over a measurement period;
   calculate at least one phase delta of at least one channel based on the identified plurality of phase deltas; and
   detect an amount of motion of the UE based on the calculated at least one phase delta of the at least one channel.

2. The apparatus of claim 1, wherein the at least one processor and the memory are further configured to receive the at least two baseband signals at two or more antenna or beam ports of the UE over the measurement period, wherein the plurality of phase deltas is identified based on the received at least two baseband signals.

3. The apparatus of claim 2, wherein the at least two baseband signals are received from a base station or a transmission-reception point (TRP).

4. The apparatus of claim 1, wherein the plurality of phase deltas of the at least two baseband signals includes a baseband phase delta and an analog radio frequency (RF) phase-locked loop (PLL) (RF PLL) phase delta, and the at least one phase delta of the at least one channel is calculated based on the baseband phase delta and the analog RF PLL phase delta.

5. The apparatus of claim 4, wherein the at least one phase delta of the at least one channel is calculated based on following formula: $\Delta_c[t]=\Delta_b[t]-\Delta_r[t]$, where $\Delta_c[t]$ refers to the at least one phase delta of the at least one channel, $\Delta_b[t]$ refers to the baseband phase delta, and $\Delta_r[t]$ refers to the analog RF PLL phase delta.

6. The apparatus of claim 4, wherein the at least one processor and the memory are further configured to calculate a variance of the at least one phase delta of the at least one channel, and the at least one processor and the memory detect the amount of the motion of the UE based on the variance of the at least one phase delta of the at least one channel being greater than a threshold variance value.

7. The apparatus of claim 1, wherein the at least one processor and the memory are further configured to reduce the measurement period based on the amount of the motion of the UE being greater than zero.

8. The apparatus of claim 1, wherein the at least one processor and the memory are further configured to increase the measurement period based on the amount of the motion of the UE being equal to zero.

9. The apparatus of claim 1, further comprising a transceiver coupled to the at least one processor, wherein the plurality of phase deltas is identified at two or more antenna or beam ports of the UE.

10. A method for wireless communication at a user equipment (UE), comprising:
    identifying a plurality of phase deltas of at least two baseband signals over a measurement period;
    calculating at least one phase delta of at least one channel based on the identified plurality of phase deltas; and
    detecting an amount of motion of the UE based on the calculated at least one phase delta of the at least one channel.

11. The method of claim 10, further comprising receiving the at least two baseband signals at two or more antenna or beam ports of the UE over the measurement period, wherein the plurality of phase deltas is identified based on the received at least two baseband signals.

12. The method of claim 11, wherein the at least two baseband signals are received from a base station or a transmission-reception point (TRP).

13. The method of claim 10, wherein the plurality of phase deltas of the at least two baseband signals includes a baseband phase delta and an analog radio frequency (RF) phase-locked loop (PLL) (RF PLL) phase delta, and the at least one phase delta of the at least one channel is calculated based on the baseband phase delta and the analog RF PLL phase delta.

14. The method of claim 13, wherein the at least one phase delta of the at least one channel is calculated based on following formula: $\Delta_c[t]=\Delta_b[t]-\Delta_r[t]$, where $\Delta_c[t]$ refers to the at least one phase delta of the at least one channel, $\Delta_b[t]$ refers to the baseband phase delta, and $\Delta_r[t]$ refers to the analog RF PLL phase delta.

15. The method of claim 13, further comprising calculating a variance of the at least one phase delta of the at least one channel, and the amount of the motion of the UE is detected based on the variance of the at least one phase delta of the at least one channel being greater than a threshold variance value.

16. The method of claim 10, further comprising reducing the measurement period based on the amount of the motion of the UE being greater than zero.

17. The method of claim 10, further comprising increasing the measurement period based on the amount of the motion of the UE being equal to zero.

* * * * *